UNITED STATES PATENT OFFICE.

GRAY STAUNTON, OF MUSKEGON, MICHIGAN.

PROCESS OF RECOVERING RUBBER FROM VULCANIZED-RUBBER WASTE.

1,168,230.   Specification of Letters Patent.   Patented Jan. 11, 1916.

No Drawing.   Application filed June 20, 1912.   Serial No. 704,734.

*To all whom it may concern:*

Be it known that I, GRAY STAUNTON, a citizen of the United States, residing at Muskegon, in the county of Muskegon and State of Michigan, have invented certain new and useful Improvements in Processes of Recovering Rubber from Vulcanized-Rubber Waste, of which the following is a specification.

The object of my invention is to provide a new and useful process for the industrial utilization of waste india rubber goods, such as worn out vehicle tires, water hose, shoes, and the like, in which india rubber is present in sufficient quantities to render the process commercially efficient, this being effected by returning to the stock treated its original qualities so that it again can be employed as new material. The india rubber thus regenerated differs in no way, substantially, from the natural india rubber as regards its mastic, elastic and tenacious properties and can be again readily vulcanized just as it was initially vulcanized. The reclaimed product is soft and gummy so that it can be worked alone without the necessity of adding fresh, new stock to the compound, if desired, and without the formation of lumps and blisters while it is being milled.

It has long been the practice, in efforts to reclaim rubber gum from vulcanized rubber waste, or scrap, to submerge it in a solution and submit it to the action of steam, or other fluids, in closed vessels, or digesters, under pressure generally from 200 to 300 pounds per square inch, and for periods of time ranging from 24 to 36 hours. The result is that the long continued high temperature produces a change in the chemical constitution of some of the fillers, in the rubber compound, and a softening and weakening of the rubber itself. Furthermore, high pressure is dangerous and expensive and there is a practical limit beyond which it is not safe to construct the digesters.

By the use of my invention the cost of reclaiming the rubber is greatly reduced and the character of the product recovered is of much greater value than by the old processes.

In carrying my invention into effect I first grind up the rubber shoddy, or waste to be reclaimed, into as fine conglomerate as practicable, in the ordinary rubber mill, reducing the waste to a highly comminuted or powdered mass. Notwithstanding that the particles of the comminuted mass are small, they are of more or less globular form and present therefore a minimum of superficial area. For this reason intimate contact of the reagent with the material is limited to the surface exposed by the generally globular particles, and in order to more intimately mix the two substances to a degree such as will insure the successful carrying out of my process I increase the superficial area of each particle or globule in a manner to be described. After the stock, in a substantially dry state, has been ground or pulverized, it is then mixed with a pulverulent, substantially dry, chemical substance, or reagent, having a chemical affinity for the sulfur contained within the stock to be reclaimed. There are a number of such known substances, such for instance as potassium carbonate, or sodium carbonate, or other alkaline reagents that may be employed for the purpose about to be described.

In experiments which I have made, in using potassium carbonate, I have secured good results by incorporating 20 to 25 per cent. of potassium carbonate, in a dry powdered state, with the ground, comminuted rubber scrap, or shoddy, and thoroughly mixing the same. After the mixing operation has been completed I then place, preferably, the conglomerate mass in a mill, of usual type, such as that in which the rubber scrap was ground, and pass the mixture through said mill, thereby mechanically forcing particles of the dry powdered reclaiming agent into each of the small particles of rubber waste, thus producing a thoroughly well distributed and intimate association mechanically effected of every particle of rubber waste with a sufficient quantity of the reagent, so that every particle of the rubber waste content is brought into intimate contact with particles of the reclaiming agent. The mill is so adjusted that each particle, or globule, of the resilient granular rubber waste as it passes through and between the rollers is dispanded, or flattened out, and at this time the powdered, or comminuted reclaiming agent, is thereby forced into contact with the increased surfaces thus exposed so that when the particles of rubber waste reassume their globular form, they intimately inclose more or less of the mixture impressed upon their enlarged surfaces. After the reclaiming agent has been thus thoroughly incorporated with the comminuted rubber waste, or stock, the conglomerate is then placed in a suitable vessel, or digester, in a substantially dry state, and is put into an oven and subjected to heat at a temperature above the melting point of sulfur, about 232 degrees Fah. and below the point at which the vulcanized rubber may be melted, or decomposed. In practice I have found that to cook the mass at 300 degrees Fah. for two or three hours gives very good results. While the mass is being subjected to this heat, the sulfur contained in the rubber waste and the alkaline agent react on one another so as to extract the sulfur from the material containing the rubber to be reclaimed. The material is then washed in water, to take out the excess alkali and carbonates and the sulfur compounds produced by union of the sulfur and the reagent which are all soluble in water. After the conglomerate has been washed, in the manner described, any residual alkali may be neutralized by adding the proper amount of acid, such as hydrochloric acid, in a suitably diluted solution, and then it may be further washed, if necessary.

While I have herein described in some particularity the process by which my invention is carried into effect it will, of course, be understood that I am not to be limited further than is defined by the appended claim.

Having described my invention, what I claim as new and desire to secure of Letters Patent of the United States is:

The process of reclaiming rubber, from vulcanized rubber waste, which consists in comminuting said waste, incorporating therewith, by mixing, a substantially dry, pulverulent reagent, having chemical affinity for a vulcanizing agent contained in said waste, and while in a dry, loose, pulverulent state heating the mixture to a temperature not to exceed 300 degrees Fahrenheit, by application of dry heat thereto.

In testimony whereof I hereunto set my hand in the presence of two witnesses.

GRAY STAUNTON.

In the presence of—
NORMAN T. THOMSON,
OSCAR C. OLSEN.